US010618037B2

(12) United States Patent
Nakai et al.

(10) Patent No.: US 10,618,037 B2
(45) Date of Patent: Apr. 14, 2020

(54) METHOD FOR RECOVERING CATALYST

(71) Applicant: ZEON CORPORATION, Tokyo (JP)

(72) Inventors: Akito Nakai, Tokyo (JP); Kazunori Furukawa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 38 days.

(21) Appl. No.: 15/738,379

(22) PCT Filed: May 25, 2016

(86) PCT No.: PCT/JP2016/065507
§ 371 (c)(1),
(2) Date: Dec. 20, 2017

(87) PCT Pub. No.: WO2016/208320
PCT Pub. Date: Dec. 29, 2016

(65) Prior Publication Data

US 2018/0169629 A1 Jun. 21, 2018

(30) Foreign Application Priority Data

Jun. 24, 2015 (JP) ................................ 2015-126678

(51) Int. Cl.

| | |
|---|---|
| ***B01J 38/48*** | (2006.01) |
| ***B01J 23/96*** | (2006.01) |
| ***B01J 23/44*** | (2006.01) |
| ***C08C 19/02*** | (2006.01) |
| ***C08F 6/08*** | (2006.01) |
| ***B01J 38/00*** | (2006.01) |
| ***B01J 20/10*** | (2006.01) |
| ***B01J 20/22*** | (2006.01) |
| ***B01J 20/28*** | (2006.01) |

(52) U.S. Cl.
CPC ............... *B01J 23/96* (2013.01); *B01J 20/10* (2013.01); *B01J 20/22* (2013.01); *B01J 20/28023* (2013.01); *B01J 23/44* (2013.01); *B01J 38/00* (2013.01); *B01J 38/48* (2013.01); *C08C 19/02* (2013.01); *C08F 6/08* (2013.01)

(58) Field of Classification Search
CPC ... B01J 23/96; B01J 38/48; B01J 20/22; B01J 20/28023; B01J 20/10; B01J 38/00; B01J 23/44; C08C 19/02; C08F 6/08
USPC ........................................................... 502/22
See application file for complete search history.

(56) References Cited

U.S. PATENT DOCUMENTS

| | | | |
|---|---|---|---|
| 4,985,540 A | 1/1991 | Bradford et al. | |
| 5,173,470 A | 12/1992 | Bruening et al. | |
| 2004/0026329 A1 | 2/2004 | Ekman et al. | |
| 2009/0163640 A1 | 6/2009 | Ong et al. | |
| 2009/0227444 A1 | 9/2009 | Ong et al. | |
| 2012/0035382 A1 | 2/2012 | Priske et al. | |
| 2012/0164039 A1 | 6/2012 | Sudo | |
| 2015/0299229 A1 | 10/2015 | Murray et al. | |
| 2015/0368387 A1* | 12/2015 | Nosaka ................. | C08F 236/10 524/572 |

FOREIGN PATENT DOCUMENTS

| | | | | |
|---|---|---|---|---|
| EP | 2 072 533 A1 | 6/2009 | | |
| JP | H03-210304 A | 9/1991 | | |
| JP | H07-500767 A | 1/1995 | | |
| JP | 2004-141694 A | 5/2004 | | |
| JP | 2004-518813 A | 6/2004 | | |
| JP | 2008-101169 A | 5/2008 | | |
| JP | 2009-149893 A | 7/2009 | | |
| JP | 2011-005365 A | 1/2011 | | |
| JP | 2011-062688 A | 3/2011 | | |
| JP | 2012-519062 A | 8/2012 | | |
| WO | 2014/083109 A2 | 6/2014 | | |
| WO | WO-2014126184 A1 * | 8/2014 | ............ | C08F 236/10 |

OTHER PUBLICATIONS

Jiang et al. "Pd-Smopex-111: A New Catalyst for Heck and Suzuki Cross-Coupling Reactions" Org. Process Res. Dev., 2007, 11 (4), pp. 769-772. (Year: 2007).*
Crudden et al. "Mercaptopropyl-Modified Mesoporous Silica: A Remarkable Support for the Preparation of a Reusable, Heterogeneous Palladium Catalyst for Coupling Reactions" J. Am. Chem. Soc., 2005, 127 (28), pp. 10045-10050 (Year: 2005).*
Sasaki et al. "Synthesis of Silicas with Amino Moieties and their Adsorption Properties of Precious Metal Ions in Hydrochloric Acid". The Resources Processsing Society of Japan, vol. 60, No. 3, pp. 145-150, 2013.
Awual et al. "Investigation of palladium (II) detection and recovery using ligand modified conjugate adsorbent". Chemical Engineering Journal, vol. 222, pp. 172-179, 2013.
Jul. 26, 2016 Search Report issued in International Patent Application No. PCT/JP2016/065507.
Dec. 26, 2017 International Preliminary Report on Patentability issued in International Patent Application No. PCT/JP2016/065507.
Rossi, Liane M. et al. "A magnetically recoverable scavenger for palladium based on thiol-modified magnetite nanoparticles". Applied Catalysis A: General, vol. 330, p. 139-144, 2007.
Jan. 11, 2019 Extended European Search Report issued in European Patent Application No. 16814091.1.

* cited by examiner

*Primary Examiner* — Haytham Soliman
(74) *Attorney, Agent, or Firm* — Oliff PLC

(57) ABSTRACT

A method for recovering a catalyst, wherein a solution containing a reaction mixture obtained by performing a hydrogenation reaction in a presence of a catalyst containing a platinum group metal is brought into contact with a fiber membrane having a group containing an amino group or a thiol group on a surface, thereby recovering the platinum group metal included in the solution is provided.

5 Claims, No Drawings

METHOD FOR RECOVERING CATALYST

TECHNICAL FIELD

The present invention relates to a method for recovering a platinum group metal included in a solution, which contains a reaction mixture obtained by performing a hydrogenation reaction in the presence of a catalyst containing a platinum group metal.

BACKGROUND ART

In the chemical industry, which produces pharmaceuticals and agrochemicals, petrochemicals and polymers, a hydrogenation reaction of a carbon-carbon unsaturated bond or a carbon-nitrogen unsaturated bond comprised in a variety of compounds and converting them to corresponding saturated bond is widely being carried out.

In the field of producing a polymer, for example, a method of selective or partial hydrogenation of a carbon-carbon double bond of a conjugated diene polymer is well known as a useful means of reforming a conjugated diene polymer, and hydrogenated conjugated diene polymers, such as a hydrogenated acrylonitrile butadiene copolymer, are being produced in an industrial volume.

Such a hydrogenated conjugated diene polymer, for instance, is produced according to the following process. That is, an emulsion polymerization of a monomer containing a conjugated diene is performed, the latex obtained by the emulsion polymerization is coagulated and dried, and the base polymer obtained by the coagulation and drying is dissolved in an organic solvent (solvent for hydrogenation reaction), and then a catalyst containing a platinum group metal is added to complete the production process.

As an example of the catalyst containing a platinum group metal used in the above-described process, a platinum group metal and a compound of a platinum group metal may be mentioned. The platinum group metal and the compound of a platinum group metal, for instance, may be used as a supported catalyst by supporting these on carriers. In other case, the compound of a platinum group metal, for instance, the salt of a platinum group metal, may be used as a catalyst for hydrogenation reaction without supporting on carriers.

In the case of using such catalyst containing a platinum group metal, platinum group metal particles of nano-order size exist in a free state (or, a platinum group metal is in an ionized state) in a solution containing a reaction mixture obtained by a hydrogenation reaction, and thus, there was a problem that platinum group metal particles of nano-order size existing in a free state is not able to be recovered. That is, when a supported catalyst is used as a catalyst containing a platinum group metal, by separating the supported catalyst from a solution containing a hydrogenated conjugated diene polymer through filtration or centrifugation, the supported catalyst containing a platinum group metal itself can be recovered. However, platinum group metal particles of nano-order size remain in a free state in the solution containing the hydrogenated conjugated diene polymer, and it is impossible to recover such platinum group metal particles of nano-order size. Meanwhile, in the case of using the salt of a platinum group metal in its original state as a catalyst containing a platinum group metal without supporting on carriers, the platinum group metal particles of nano-order size remain in a free state in the solution containing the hydrogenated conjugated diene polymer, and thus, likewise, the platinum group metal particles of nano-order size is not able to be recovered.

In regards to this, the Patent Document 1 suggests a method of bringing a solution containing a reaction mixture obtained by performing a hydrogenation reaction in the presence of a catalyst containing a platinum group metal into contact with an ion exchange resin having a particular functional group, thereby recovering the catalyst containing a platinum group metal present in the solution. However, in terms of the technology disclosed in the Patent Document 1, there was a problem that in order to recover the catalyst containing a platinum group metal, the solution containing the reaction mixture obtained by a hydrogenation reaction had to be blended with an ion exchange resin and stirred for a long time, and thus, the efficiency was low in recovering the catalyst containing a platinum group metal.

RELATED ART

Patent Documents

Patent Document 1: JP 2009-149893 A

SUMMARY OF THE INVENTION

Problem to be Solved by the Invention

The present invention was made in view of such a circumstance, and has an object to provide a method for recovering a catalyst that advantageously recovers a platinum group metal included in a solution, which contains a reaction mixture obtained by a hydrogenation reaction in the presence of a catalyst containing a platinum group metal.

Means for Solving the Problem

The present inventors discovered that, by bringing a solution containing a reaction mixture obtained by a hydrogenation reaction performed in the presence of a catalyst containing a platinum group metal into contact with a fiber membrane having a particular functional group on the surface, the platinum group metal included in the solution could be advantageously recovered, and thereby completed the present invention.

Furthermore, the present inventors discovered that, by bringing a solution containing a reaction mixture obtained by a hydrogenation reaction performed in the presence of a catalyst containing a platinum group metal into contact with silica having a particular functional group on the surface, the platinum group metal included in the solution could be advantageously recovered, and thereby completed the present invention.

That is, according to the present invention, there is provided a method for recovering a catalyst, wherein a solution containing a reaction mixture obtained by performing a hydrogenation reaction in a presence of a catalyst containing a platinum group metal is brought into contact with a fiber membrane having a group containing an amino group or a thiol group on a surface, thereby recovering the platinum group metal included in the solution.

Moreover, according to the present invention, there is provided a method for recovering a catalyst, wherein a solution containing a reaction mixture obtained by performing a hydrogenation reaction in a presence of a catalyst containing a platinum group metal is brought into contact with silica having a group containing an amino group or a thiol group on a surface, thereby recovering the platinum group metal included in the solution.

In the present invention, the platinum group metal is preferably palladium.

Also, in the present invention, the reaction mixture preferably contains a hydrogenated conjugated diene polymer.

Further, according to the present invention, there is provided a method for producing a hydrogenated conjugated diene polymer comprising a process for hydrogenation reaction, wherein, in an organic solvent, a conjugated diene polymer is hydrogenated in a presence of a catalyst containing a platinum group metal so as to obtain a solution containing a hydrogenated conjugated diene polymer, and a process for recovering a catalyst, wherein the solution containing a hydrogenated conjugated diene polymer is brought into contact with a fiber membrane having a group containing an amino group or a thiol group on a surface, thereby recovering the platinum group metal included in the solution.

Moreover, according to the present invention, there is provided a method for producing a hydrogenated conjugated diene polymer comprising a process for hydrogenation reaction, wherein, in a solvent, a conjugated diene polymer is hydrogenated in a presence of a catalyst containing a platinum group metal so as to obtain a solution containing a hydrogenated conjugated diene polymer, and a process for recovering a catalyst, wherein the solution containing a hydrogenated conjugated diene polymer is brought into contact with silica having a group containing an amino group or a thiol group on a surface, thereby recovering the platinum group metal included in the solution.

Effects of Invention

According to the method for recovering a catalyst of the present invention, it is possible to advantageously recover a platinum group metal included in a solution, which contains a reaction mixture obtained by a hydrogenation reaction in the presence of a catalyst containing a platinum group metal.

DESCRIPTION OF EMBODIMENTS

The method for recovering a catalyst of the present invention can be widely applied to the production of pharmaceuticals, agrichemicals, industrial chemicals, petroleum, petrochemicals, polymers, fats and oils products, cooking oil, lubricant and perfume when performing a hydrogenation reaction using a catalyst containing a platinum group metal, and enables an advantageous recovery of a platinum group metal from a solution containing a reaction mixture obtained by a hydrogenation reaction.

The reaction mixture obtained by a hydrogenation reaction to which the method for recovering a catalyst of the present invention can be applied is not particularly limited, as long the reaction mixture which is obtained by a hydrogenation reaction in the presence of a catalyst containing a platinum group metal. Examples of such hydrogenation reaction include a hydrogenation of an acetylene bond to a carbon-carbon double bond represented by a hydrogenation of acetylene to ethylene, and a hydrogenation of 3-hexyne-1-ol to cis-3-hexene-1-ol; a hydrogenation reaction of a carbon-carbon double bond to a saturated bond represented by a hydrogenation of gasoline (improvement of gasoline quality), production of iso-octane from diisobutylene, production of a saturated glyceride from an unsaturated glyceride, and production of a hydrogenated conjugated diene polymer from a conjugated diene polymer; a hydrogenation reaction of a carbonyl group of producing corresponding alcohols from cyclopentanone or cyclohexanone; and, a hydrogenation reaction for converting a nitrile group or an azomethine group (Schiff base) into an amino group.

Among these, the method for recovering a catalyst according to the present invention can be appropriately applied to one containing a hydrogenated conjugated polymer which is obtained by a hydrogenation reaction of a conjugated diene polymer.

Hereinafter, an illustration is made for the method of producing a hydrogenated conjugated diene polymer of the present invention, which is obtained by a hydrogenation reaction of a conjugated diene polymer, and a detailed description is provided for the method for recovering a catalyst of the present invention. However, the method for recovering a catalyst of the present invention is not limited to a solution related to a hydrogenated conjugated diene polymer obtained by a hydrogenation reaction of a conjugated diene polymer. Further, hereafter, an illustration is made for a method for recovering a catalyst using a fiber membrane having a group containing an amino group or a thiol group on the surface, but in the method for recovering a catalyst of the present invention, as described below, silica having a group containing an amino group or a thiol group on the surface may be used instead of a fiber membrane having a group containing an amino group or a thiol group on the surface.

The method for producing a hydrogenated conjugated diene polymer of the present invention includes, a process for hydrogenation reaction, wherein, in a solvent, a conjugated diene polymer is hydrogenated in a presence of a catalyst containing a platinum group metal so as to obtain a solution containing a hydrogenated conjugated diene polymer, and a process for recovering a catalyst, wherein the solution containing a hydrogenated conjugated diene polymer is brought into contact with silica having a group containing an amino group or a thiol group on a surface, thereby recovering the platinum group metal included in the solution.

By hydrogenation in the process for a hydrogenation reaction, it means a reaction of adding hydrogen to at least a part of a carbon-carbon double bond included in a conjugated diene polymer to convert it to a saturated bond. The conjugated diene polymer used in the present invention is a polymer produced by using a conjugated diene monomer alone, or by using a monomer that can polymerize with a conjugated diene monomer with the relevant conjugated diene monomer, through the conventionally known emulsion polymerization method or solution polymerization method, preferably through emulsion polymerization method.

The conjugated diene monomer to form a conjugated diene polymer is not particularly limited as long as it is a polymerizable monomer having a conjugated diene structure, and 1,3-butadiene, 2-methyl-1,3-butadiene (isoprene), 2,3-dimethyl-1,3-butadiene, 2-chloro-1,3-butadiene, and 1,3-pentadiene etc. may be mentioned. Among these, 1,3-butadiene, 2-methyl-1,3-butadiene are preferable, while 1,3-butadiene is more preferable.

As a monomer that can be polymerized with a conjugated diene monomer, for example, α,β-ethylenically unsaturated nitrile monomer such as acrylonitrile, methacrylonitrile and crotononitrile; α,β-ethylenically unsaturated carboxylic acid such as acrylic acid, methacrylic acid, crotonic acid, fumaric acid, maleic acid and itaconic acid; α,β-ethylenically unsaturated carboxylic acid ester such as methyl acrylate, n-butyl acrylate, 2-ethylhexyl acrylate, trifluoroethyl acrylate and methyl methacrylate; α,β-ethylenically unsaturated carboxylic acid amide such as acrylamide and methacrylamide; vinyl aromatic compound such as styrene, α-methylstyrene, p-methylstyrene and divinylbenzene; vinyl ester such as vinyl acetate and vinyl propionate; and, vinyl ether compound such as fluoroethylene vinyl ether; etc. may be mentioned.

As specific examples of a conjugated diene polymer used in the present invention, butadiene polymer, isoprene polymer, butadiene-styrene copolymer, acrylonitrile-butadiene copolymer, acrylonitrile-isoprene copolymer, acrylonitrile-butadiene-isoprene copolymer, methacrylonitrile-butadiene copolymer, methacrylonitrile-isoprene copolymer, methacrylonitrile-butadiene-isoprene copolymer, acrylonitrile-methacrylonitrile-butadiene copolymer, acrylonitrile-butadiene-methyl acrylate copolymer and acrylonitrile-butadiene-acrylic acid copolymer etc. may be mentioned.

Among the above conjugated diene polymers, from the viewpoint of practicality and universality as a base material for a hydrogenated conjugated diene polymer, acrylonitrile-butadiene copolymer and methacrylonitrile-butadiene copolymer are preferable, while acrylonitrile-butadiene copolymer is more preferable.

The composition ratio of monomer unit in a conjugated diene polymer is not particularly limited, but 5 to 100 wt % of conjugated diene monomer unit and 95 to 0 wt % of monomer unit which can copolymerize therewith is preferable, while 10 to 90 wt % of conjugated diene monomer unit and 90 to 10 wt % of monomer unit which can copolymerize therewith is more preferable. Moreover, the average molecular weight of a conjugated diene polymer (gel permeation chromatography, in terms of standard polystyrene) is not particularly limited, but is generally 5,000 to 500,000.

In the emulsion polymerization method, which is a preferable method of preparing a conjugated diene polymer, a radical polymerization initiator is generally used to perform polymerization in an aqueous medium. In the emulsion polymerization method, the well-known polymerization initiator or molecular weight adjuster may be used. The polymerization may be any one of the batch-type polymerization, semi-batch-type polymerization or continuous-type polymerization, while the polymerization temperature or pressure is not particularly limited. The emulsifier used is not particularly limited, and anionic surfactant, cationic surfactant, ampholytic surfactant and nonionic surfactant may be used, but anionic surfactant is preferable. These emulsifiers may be used as single types alone or a plurality of two types or more combined. The quantity used is not particularly limited.

The solid concentration of a conjugated diene polymer latex obtained by the emulsion polymerization is not particularly limited, but is generally 2 to 70 wt % and preferably 5 to 60 wt %. The solid concentration may be appropriately adjusted by known methods such as blending, dilution and condensation.

The hydrogenation reaction of a conjugated diene polymer may be performed to the latex obtained by the emulsion polymerization in latex state itself, but from the viewpoint of catalyst activity, it is preferable to dissolve the conjugated diene polymer rubber which is obtained by coagulating and drying the latex obtained by the emulsion polymerization, in a suitable organic solvent, and hydrogenate it in the form of a polymer solution.

The coagulation and drying of the latex may be performed according to the known method, but by providing a process for bringing a crumb obtained by coagulation into contact with an alkaline aqueous solution, it is preferable to reform the obtained conjugated diene polymer rubber so that a pH of a polymer solution thereof becomes larger than 7, which is measured for a polymer solution obtained by dissolving the obtained conjugated diene polymer rubber in tetrahydrofuran (THF). The pH of the polymer solution measured in dissolving in THF is preferably in the range of 7.2 to 12, more preferably 7.5 to 11.5, and most preferably 8 to 11. By contacting the crumb with the alkaline aqueous solution, a solution-based hydrogenation can be progressed rapidly.

The concentration of a conjugated diene polymer in a polymer solution during a hydrogenation reaction is preferably 1 to 70 wt %, more preferably 1 to 40 wt %, and particularly preferably 2 to 20 wt %. As an organic solvent, for example, aliphatic hydrocarbons such as n-hexane, cyclohexane and n-heptane; aromatic hydrocarbons such as benzene, toluene, xylene and chlorobenzene; ketones such as acetone, methyl ethyl ketone, diethyl ketone, methyl isopropyl ketone, 2-pentanone, 3-pentanone, cyclopentanone and cyclohexanone; ethers such as diethyl ether, tetrahydrofuran, dioxane and anisole; and, esters such as ethyl acetate; etc. may be mentioned. Among these, ketones are preferably used, while acetone is particularly appropriately used.

When performing a hydrogenation reaction in the present invention, a catalyst containing a platinum group metal is used for a hydrogenation catalyst. The catalyst containing a platinum group metal is a catalyst containing a platinum group metal, that is, ruthenium, rhodium, palladium, osmium, iridium or platinum, and though not particularly limited, palladium compound and rhodium compound is preferable, while palladium compound is more preferable from the viewpoint of catalyst activity or ease-of-obtainment. Also, two types or more of platinum group metal compounds may be used, but in this case, likewise, palladium compound is preferred as a main catalyst component.

A palladium compound used is generally Group II or IV, of which the form is a salt or a complex salt.

As a palladium compound, for example, palladium acetate, palladium cyanide, palladium fluoride, palladium chloride, palladium bromide, palladium iodide, palladium nitrate, palladium sulfate, palladium oxide, palladium hydroxide, dichloro(cyclooctadiene) palladium, dichloro (norboinadiene) palladium, dichlorobis(triphenylphosphine) palladium, sodium tetrachloropalladate, ammonium hexachloropalladate and potassium tetracyanopalladate, etc. may be mentioned.

Among the above palladium compounds, palladium acetate, palladium nitrate, palladium sulfate, palladium chloride, sodium tetrachloropalladate and ammonium hexachloropalladate are preferable, while palladium acetate, palladium nitrate and palladium chloride are more preferable.

As a rhodium compound, for example, rhodium chloride, rhodium bromide, rhodium iodide, rhodium nitrate, rhodium sulfate, rhodium acetate, rhodium formate, rhodium propionate, rhodium butyrate, rhodium valerate, rhodium naphthenate, rhodium acetylacetonate, rhodium oxide and rhodium trihydroxide, etc. may be mentioned.

In the present invention, as for a catalyst containing a platinum group metal, the above palladium compound or rhodium compound may be used in its original form, or the catalyst components of the above-described palladium compound or rhodium compound may be supported on a carrier to be used as a supported catalyst.

As for a carrier to form a supported catalyst, any carrier of a metal catalyst may be used in general, but specifically, an inorganic compound containing carbon, silicon, aluminum or magnesium is preferable, and among these as well, from the viewpoint of the fact that the absorption efficiency of catalyst components of a palladium compound or a rhodium compound increases, it is preferable to use a carrier with the characteristic of the average particle diameter of 10 nm to 100 nm and specific surface area of 200 to 2,000 $m^2/g$.

Such carrier is appropriately selected from known catalyst carriers such as activated carbon, activated clay, talc, clay, alumina gel, silica, diatomaceous earth and synthetic zeolite. As the method for supporting catalyst components on the carrier, for example, impregnation, coating, spraying and sedimentation, etc. may be mentioned. The load amount of the catalyst component is generally 0.5 to 80 wt %, preferably 1 to 50 wt %, and more preferably 2 to 30 wt % in terms of the ratio of catalyst component with respect to the total amount of catalyst and carrier. The carrier supporting the catalyst component may be famed in the shape of a spherical, column, polygonal column and honeycomb depending on the type of reactor or the form of reaction.

Further, in the case of using the salt of platinum group metal such as palladium compound and rhodium compound as a catalyst containing a platinum group metal in its original state without supporting on a carrier, it is preferable to use a stabilizer to stabilize these compounds. By making the stabilizer present in a medium in which a catalyst containing a platinum group metal, such as a palladium compound and rhodium compound, is dissolved or dispersed, the compound to be hydrogenated such as a conjugated diene polymer can be hydrogenated with a high hydrogen content.

As the stabilizer, for example, a polymer of vinyl compound having a polar group in a side chain, such as polyvinylpyrrolidone, polyvinyl alcohol, polyvinyl acetal and polyalkylvinylether; a metallic salt of polyacrylic acid such as sodium polyacrylate and potassium polyacrylate; a polyether such as polyethylene oxide, polypropylene oxide and ethylene oxide-propylene oxide copolymer; a cellulose derivative such as carboxymethyl cellulose and hydroxypropyl cellulose; a natural polymer such as gelatin and albumin; etc. may be mentioned. Among these, a polymer of vinyl compound having a polar group in a side chain, or a polyether is preferable. Among the polymer of vinyl compound having a polar group in a side chain, polyvinylpyrrolidone and polyalkylvinylether are preferable, while polymethylvinylether is more preferable.

Further, when performing a hydrogenation reaction, a reducing agent may be used in combination, as the reducing agent, for example, hydrazines such as hydrazine, hydrazine hydrate, hydrazine acetate, hydrazine sulfate and hydrazine hydrochloride, or a compound that generates hydrazine existing in a free state, etc. may be mentioned.

The temperature for performing a hydrogenation reaction is generally 0 to 200° C., preferably 5 to 150° C., and more preferably 10 to 100° C. By having the temperature for a hydrogenation reaction in the above range, any side reaction can be suppressed and the reaction rate can be made sufficient.

A hydrogen pressure when performing a hydrogenation reaction is generally 0.1 to 20 MPa, preferably 0.1 to 15 MPa, and more preferably 0.1 to 10 MPa. Though the reaction time is not particularly limited, it is generally 30 minutes to 50 hours. Also, as for hydrogen gas, it is preferable to replace the reaction system with inert gas such as nitrogen, and apply more pressure after replacing with hydrogen.

Moreover, in the case of using a supported catalyst for a catalyst containing a platinum group metal, a solution containing the hydrogenated conjugated diene polymer can be obtained by separating the supported catalyst through filtration or centrifugation etc.

Then, with respect to the solution containing the hydrogenated conjugated diene polymer obtained thereof, in order to recover a platinum group metal contained in the solution, which specifically refers to platinum group metal particles of nano-order size (specifically, a number of nm to tens of nm order) existing freely in the solution, a fiber membrane having a group containing an amino group or a thiol group on the surface is brought into contact, and the platinum group metal particles of nano-order size existing freely are absorbed to a fiber membrane having a group containing an amino group or a thiol group on the surface so as to thereby recover the free platinum group metal particles of nano-order size. As for the platinum group metal particles of nano-order size that are absorbed to a fiber membrane having a group containing an amino group or a thiol group on the surface, ones where the peak of particle diameter is in the range of 1 nm and more and 90 nm and less are preferable when the solution in which the platinum group metal particles are included is evaluated using a precision particle size distribution measurement instrument.

That is, in the case of using a supported catalyst as a catalyst containing a platinum group metal, a supported catalyst containing a platinum group metal can be recovered by separating the supported catalyst from the solution containing the hydrogenated conjugated diene polymer through filtration or configuration etc., but platinum group metal particles of nano-order size tend to exist in a free state in the solution containing the hydrogenated conjugated diene polymer. Also, as a catalyst containing a platinum group metal, in the case of using the salt of platinum group metal in its original form without supporting on a carrier, the solution containing the hydrogenated conjugated diene polymer tends to contain platinum group metal particles of nano-order size existing in a free state.

According to the present invention, the free platinum group metal particles of nano-order size can be recovered by bringing a fiber membrane having a group containing an amino group or a thiol group on the surface into contact with the solution in which platinum group metal particles of nano-order size exist in a free state, so that the free platinum group metal particles of nano-order size are absorbed to a fiber membrane having a group containing an amino group or a thiol group on the surface.

In particular, according to the present invention, even when platinum group metal particles of nano-order size existing in a free state in the solution are protected by a protecting group and exist in the form of colloid, the platinum group metal particles are advantageously absorbed and recovered.

The protecting group may be any that can protect the platinum group metal particles and is not particularly limited, but examples include a compound for hydrogenation such as a conjugated diene polymer, or a stabilizer that is used as necessary in case that the salt of a platinum group metal is used in its original form without supporting on a carrier as a catalyst containing a platinum group metal.

According to the present invention, even when the platinum group metal particles are protected by a protecting group, the free platinum group metal particles of nano-order size are absorbed by bringing a fiber membrane having a group containing an amino group or a thiol group on the surface into contact with the solution in which platinum group metal particles exist in a free state, and as a result, the platinum group metal particles of nano-order size existing in a free state can be recovered.

The method for bringing a fiber membrane having a group containing an amino group or a thiol group on the surface into contact with a solution containing a reaction mixture obtained by a hydrogenation reaction in the presence of a catalyst containing a platinum group metal is not particularly limited, but an example may be filtering a solution containing the above-mentioned hydrogenated conjugated diene polymer with a fiber membrane having a group containing an amino group or a thiol group on the surface. As for a method of filtering a solution containing a hydrogenated conjugated diene polymer, an example may be to facilitate an instrument for recovering platinum group metal particles by fixing a fiber membrane having a group containing an amino group or a thiol group on the surface to a filter holder, and connecting a syringe the filter holder, and then pour a solution containing a hydrogenated conjugated diene polymer into the syringe equipped in the instrument for recovering platinum group metal particles to perform a filtration. While performing the filtration, it is preferable to pressurize the solution by nitrogen gas etc. to perform a filtration. Even when the space velocity (SV) of a solution containing the hydrogenated conjugated diene polymer is increased, the rate of absorption of platinum group metal particles to a fiber membrane can be increased by pressurizing nitrogen gas into the solution. Through this, the absorption rate of platinum group metal particles to a fiber membrane remains high while the solution is filtered at a greater speed, and thus, the efficiency of recovering platinum group metal particles can be improved.

When performing filtration by pressurizing the solution by nitrogen gas etc., the pressure applied to the solution containing a reaction mixture obtained by the hydrogenation reaction in the presence of a catalyst containing a platinum group metal is preferably 2 to 20 $kg/cm^2$, more preferably 6 to 18 $kg/cm^2$, and even more preferably 10 to 15 $kg/cm^2$. The method for controlling the pressure applied to the solution containing the reaction mixture obtained by the hydrogenation reaction in the presence of a catalyst containing a platinum group metal within the abovementioned range is not particularly limited, but an example may be controlling the pressure in the syringe of the instrument for recovering platinum group metal particles within the above range with nitrogen gas etc.

When bringing a solution containing a hydrogenated conjugated diene polymer into contact with a fiber membrane having a group containing an amino group or a thiol group on the surface, the concentration of a hydrogenated conjugated diene polymer in a solution containing a hydrogenated conjugated diene polymer is preferably 0.001 to 20 wt %, more preferably 0.002 to 15 wt %, and particularly preferably 0.005 to 10 wt %. Having it within this range advantageously maintains the productivity of the recovery of platinum group metal particles and the stability of recovery efficiency.

The fiber membrane used in the present invention to form a fiber membrane having a group containing an amino group or a thiol group on the surface is not particularly limited, and can be any that can adopt an amino group or a thiol group on the surface, but a ceramic fiber membrane may be mentioned.

The ceramic that composes a ceramic fiber membrane generally represents a sintered body in which inorganic substance is sintered, and thereby includes shaped article, powder and membrane of the sintered body of all inorganic compounds, irrespective of metal or non-metal. The ceramic that composes a ceramic fiber membrane is not particularly limited, but examples include glass, cement, pottery and porcelain. Among these as well, it is preferable to use glass from the viewpoint that platinum group metal particles can be recovered at a high efficiency by adopting a group containing an amino group or a thiol group on the surface.

As for the glass, it generally includes a solid containing amorphous matters showing a glass transition phenomenon due to a temperature elevation, and substances that become a solid showing a glass transition phenomenon due to a temperature elevation, and though not particularly limited, for example, oxide showing a glass transition phenomenon and substance that becomes oxide showing a glass transition phenomenon by heating at a high temperature, specifically, silicon dioxide, etc. may be mentioned. Also, the glass includes silicon oxide or silica that shows substance composed by silicon oxide.

In case of using the glass for ceramic composing a ceramic fiber membrane, as for the ceramic fiber membrane, a glass fiber membrane comprised of glass fibers shaped in the form of a membrane may be used. Also, glass fibers are fibers produced with glass as the base material, and, for example, ones obtained by methods of winding and pulling or blowing the glass molten at a high temperature at high speed so as to be a shape of fiber with the average diameter of micron units (1/1000 of 1 mm) may be mentioned. Glass fibers are generally categorized into staple fiber and filament, and are used for various purposes. The glass fibers composing the glass fiber membrane used in the present invention can be any one of the staple fiber or the filament.

The type of glass composing the glass fiber is not particularly limited, for example, aluminosilicate glass, aluminoborosilicate glass, uranium glass, potash glass, silicate glass, crystallized glass, germanium glass, quartz glass, soda glass, lead glass, barium borosilicate glass, and borosilicate glass including borosilicate and silicate.

The fiber membrane having a group containing an amino group or a thiol group on the surface used in the present invention is obtained by adopting a group containing an amino group or a thiol group on the surface of such fiber membrane.

The pore diameter of the fiber membrane having a group containing an amino group or a thiol group on the surface is not particularly limited, but is preferably 0.1 to 2.0 μm, more preferably 0.2 to 1.5 μm, and even more preferably 0.3 to 1.0 μm. By having the pore diameter larger than the lowest limit in the above range, the space velocity (SV) when filtering a solution containing a hydrogenated conjugated diene polymer is controlled within an appropriate range, and the efficiency of recovering platinum group metal particles is maintained more advantageously. Meanwhile, by having the pore diameter smaller than the upper limit in the above range, the contact area of the fiber membrane having a group containing an amino group or a thiol group on the surface with the solution containing the hydrogenated conjugated diene polymer is controlled within an appropriate range, and the absorption rate of platinum group metal particles is maintained more advantageously.

The thickness of the fiber membrane having a group containing an amino group or a thiol group on the surface is not particularly limited, but is preferably 300 to 8,800 μm, more preferably 320 to 4,400 μm, and even more preferably 350 to 3,200 μm. By having the thickness of the fiber membrane thicker than the lowest limit in the above range, the absorption rate of platinum group metal particles during filtration of a solution containing a hydrogenated conjugated diene polymer is maintained more advantageously. Meanwhile, by having the thickness of the fiber membrane thinner than the upper limit in the above range, the space velocity (SV) during filtration of the solution containing the hydrogenated conjugated diene polymer is controlled within an appropriate range, and the efficiency of recovering platinum group metal particles is maintained more advantageously.

Further, the thickness of the fiber membrane having a group containing an amino group or a thiol group on the surface may be adjusted by changing the thickness of the fiber membrane itself having a group containing an amino group or a thiol group on the surface, or by overlapping many layers of the fiber membrane having a group containing an amino group or a thiol group on the surface.

The shape and size of the fiber membrane having a group containing an amino group or a thiol group on the surface is not particularly limited and can be chosen discretionally, and an example may be a fiber membrane in the shape of a circular sheet of 20 to 100 mm in size.

In case of filtering the solution containing a reaction mixture obtained by a hydrogenation reaction in the presence of a catalyst containing a platinum group metal through a fiber membrane having a group containing an amino group or a thiol group on the surface, it is preferable to have the space velocity (SV) in the range of 100 to 2,000 (1/hr), and more preferable to have it in the range of 400 to 600 (1/hr). By having the space velocity (SV) lower than the upper limit in the above range, the absorption rate of platinum group metal particles is maintained more advantageously. Meanwhile, by having the space velocity (SV) higher than the lowest limit in the above range, the efficiency of recovering platinum group metal particles is maintained more advantageously. Also, the space velocity (SV) may be controlled by adjusting the pore diameter, thickness, shape and size etc. of the fiber membrane having a group containing an amino group or a thiol group on the surface.

Further, in the present invention, in case of using a fiber membrane having a group containing an amino group on the surface as a fiber membrane having a group containing an amino group or a thiol group on the surface, the amino group may have hydrogen atoms, which form the amino group, either substituted or unsubstituted, but is preferable to use an unsubstituted amino group, that is, a structure represented by $—NH_2$. For instance, the effect of absorbing platinum group metal particles tends to be lowered in an amino group substituted with an alkyl group.

Moreover, as the fiber membrane having a group containing an amino group or a thiol group on the surface, a fiber membrane having a group containing only an amino group on the surface, or a fiber membrane having a group containing only a thiol group on the surface, or a fiber membrane having both of a group containing an amino group and a group containing a thiol group on the surface may be mentioned. Among these as well, from the viewpoint that the effect of absorbing platinum group metal particles is excellent, it is preferable to use a fiber membrane having at least a group containing an amino group on the surface.

As a group containing an amino group forming a fiber membrane having a group containing an amino group or a thiol group on the surface, from the aspect that the effect of absorbing platinum group metal particles can be further heightened, it is preferable to use a hydrocarbon group with 1 to 12 carbons having an amino group, and more preferably a hydrocarbon group with 1 to 6 carbons having an amino group. Also, as a hydrocarbon group having an amino group, it is preferable for the terminal part of a hydrocarbon group to be an amino group.

The hydrocarbon group having an amino group is not particularly limited, and a linear or branched hydrocarbon group which is substituted or unsubstituted may be mentioned. Such a hydrocarbon group having an amino group may have a heteroatom, and in such case, the number of heteroatoms is not particularly limited, but 1 to 6 heteroatoms is preferable, for example. The position of a heteroatom in a hydrocarbon group having an amino group is not particularly limited, and may be in a hydrocarbon chain of the hydrocarbon group (for example, structure represented by $—CH_2—S—CH_2—$, $—CH_2—O—CH_2—$, $—CH_2—NH—CH_2—$).

Further, a heteroatom refers to an atom belonging to group 15 and 16 of the periodic table. As specific examples of a heteroatom, nitrogen atom, oxygen atom, phosphorous atom, sulfur atom, arsenic atom and selenium atom, etc. may be mentioned. Among these as well, nitrogen atom, sulfur atom and oxygen atom are preferable.

In case that hydrocarbon group having an amino group is a branched hydrocarbon group having an amino group, it may have an amino group or a thiol group at the terminal part of the branch.

Moreover, a hydrocarbon group having an amino group may have an aromatic hydrocarbon at the terminal part. Such an aromatic hydrocarbon may be a heterocyclic aromatic compound having a ring structure including elements other than carbon, and may have one or more than two amino group or thiol group.

As specific examples of such hydrocarbon group having an amino group, aminomethyl group, 2-aminoethyl group, 3-aminopropyl group, 4-aminobutyl group and 5-aminopentyl group, etc. may be mentioned.

Or, as specific examples of such hydrocarbon group having an amino group, groups represented by the following formulas (1) to (7) also may be mentioned.

(1)

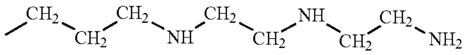

(2)

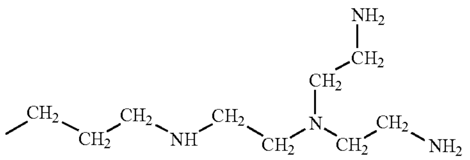

(3)

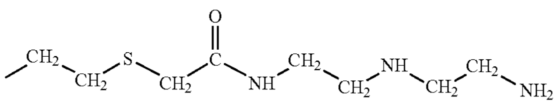

(4)

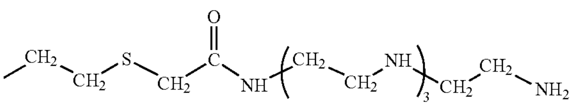

(5)

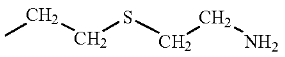

(6)

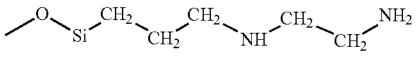

(7)

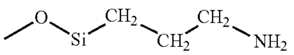

The method for adopting the hydrocarbon group having an amino group etc. to a fiber membrane is not particularly limited, but an example thereof, in case of using a fiber membrane containing silicon as a fiber membrane composing a fiber membrane having a group containing an amino group or a thiol group on the surface, method for performing silane coupling treatment by using an amino-based silane coupling agent having an amino group may be used.

As an amino-based silane coupling agent, a compound having a group containing silicon and a group containing an amino group may be mentioned, and though not particularly limited, for example, a compound having a structure in which a group containing silicon and a group containing an amino group are connected through an alkylene group may be mentioned. As an alkylene group connecting a group containing silicon and a group containing an amino group in such a compound, an alkylene group with 1 to 12 carbons is preferable, an alkylene group with 1 to 6 carbons is more preferable, and an alkylene group with 3 carbons is even more preferable. As specific examples of such amino-based silane coupling agent, aminomethyl trimethoxysilane, aminomethyl methyldimethoxysilane, aminomethyl triethoxysilane, aminomethyl methyldiethoxysilane, 2-aminoethyl trimethoxysilane, 2-aminoethyl methyldimethoxysilane, 2-aminoethyl triethoxysilane, 2-aminoethyl methyldiethoxysilane, 3-aminopropyl trimethoxysilane, 3-aminopropyl methyldimethoxysilane, 3-aminopropyl dimethylmethoxysilane, 3-aminopropyl triethoxysilane, 3-aminopropyl methyldiethoxysilane, 3-aminopropyl dimethylethoxysilane, 4-aminobutyl trimethoxysilane, 4-aminobutyl methyldimethoxysilane, 4-aminobutyl triethoxysilane, 4-aminobutyl methyldiethoxysilane, 5-aminopentyl trimethoxysilane, 5-aminopentyl methyldimethoxysilane, 5-aminopentyl triethoxysilane and 5-aminopentyl methyldiethoxysilane, etc. may be mentioned, and among these as well, 3-aminopropyl triethoxysilane is preferable.

Furthermore, a group containing a thiol group forming a fiber membrane having a group containing an amino group or a thiol group on the surface, from the viewpoint that the effect of absorbing platinum group metal particles can be further heightened, a hydrocarbon group with 1 to 12 carbons having a thiol group is preferable, and a hydrocarbon group with 1 to 6 carbons having a thiol group is more preferable. Also, as a hydrocarbon group having a thiol group, it is preferable for the terminal part of the hydrocarbon group to be a thiol group.

The hydrocarbon group having a thiol group is not particularly limited, and a linear or branched hydrocarbon group which is substituted or unsubstituted may be mentioned. Such a hydrocarbon group having a thiol group may include a heteroatom, and in such case, the number of heteroatoms is not particularly limited, but 1 to 6 heteroatoms is preferable, for example. The position of a heteroatom in the hydrocarbon group having a thiol group is not particularly limited, and may be in a hydrocarbon chain of the hydrocarbon group (for example, structure represented by $-CH_2-S-CH_2-$, $-CH_2-O-CH_2-$, $-CH_2-NH-CH_2-$).

In case that hydrocarbon group having a thiol group is a branched hydrocarbon group, it may have an amino group or a thiol group at the terminal part of the branch.

Moreover, a hydrocarbon group having a thiol group may have an aromatic hydrocarbon at the terminal part. Such an aromatic hydrocarbon may be a heterocyclic aromatic compound having a ring structure including elements other than carbon, and may have one or more than two amino group or thiol group.

As specific examples of such hydrocarbon group having a thiol group, a mercaptomethyl group, 2-mercaptoethyl group, 3-mercaptopropyl group, 4-mercaptobutyl group and 5-mercaptopentyl group, etc. may be mentioned.

Or, as specific examples of such hydrocarbon group having a thiol group, groups represented by the following formulas (8) to (12) also may be mentioned.

(8)

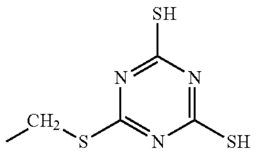

(9)

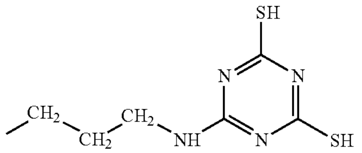

(10)

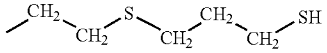

(11)

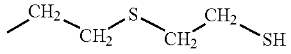

(12)

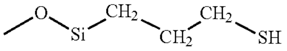

The method for adopting the hydrocarbon group having a thiol group etc. to a fiber membrane is not particularly limited, but an example thereof, in case of using a fiber membrane containing silicon as a fiber membrane composing a fiber membrane having a group containing an amino group or a thiol group on the surface, method for performing silane coupling treatment by using a thiol-based silane coupling agent having a thiol group may be used.

A a thiol-based silane coupling agent, a compound having a group containing silicon and a group containing a thiol group may be mentioned, and though not particularly limited, for example, a compound having a structure in which a group containing silicon and a group containing a thiol group are connected through an alkylene group may be mentioned. As an alkylene group connecting a group containing silicon and a group containing a thiol group in such a compound, an alkylene group with 1 to 12 carbons is preferable, an alkylene group with 1 to 6 carbons is more preferable, and an alkylene group with 3 carbons is even more preferable. As specific examples of such thiol-based silane coupling agent, mercaptomethyl trimethoxysilane, mercaptomethyl methyldimethoxysilane, mercaptomethyl triethoxysilane, mercaptomethyl methyldiethoxysilane, 2-mercaptoethyl trimethoxysilane, 2-mercaptoethyl methyldimethoxysilane, 2-mercaptoethyl triethoxysilane, 2-mercaptoethyl methyldiethoxysilane, 3-mercaptopropyl trimethoxysilane, 3-mercaptopropyl methyldimethoxysilane, 3-mercaptopropyl dimethylmethoxysilane, 3-mercaptopropyl triethoxysilane, 3-mercaptopropyl methyldiethoxysilane, 3-mercaptopropyl dimethylethoxysilane, 4-mercaptobutyl trimethoxysilane, 4-mercaptobutyl methyldimethoxysilane, 4-mercaptobutyl triethoxysilane, 4-mercaptobutyl methyldiethoxysilane, 5-mercaptopentyl trimethoxysilane, 5-mercaptopentyl methyldimethoxysilane, 5-mercaptopentyl triethoxysilane and 5-mercaptopentyl methyldiethoxysilane, etc. may be mentioned, and among these as well, 3-mercaptopropyl triethoxysilane is preferable.

When performing silane coupling treatment using the above-mentioned amino-based silane coupling agent or thiol-based silane coupling agent, it is preferable to activate the surface of the fiber membrane in advance. As an activation treatment, though not particularly limited, for example, a method of washing the fiber membrane with an aqueous solution containing hydrogen peroxide, sodium hydroxide, potassium hydroxide or ammonium, etc. may be mentioned. When washing the fiber membrane, for example, the method of immersing the fiber membrane in an aqueous solution containing hydrogen peroxide, sodium hydroxide, potassium hydroxide or ammonium, etc. and stirring it by shaking is preferable. The temperature condition during stirring by shaking is not particularly limited, but is preferably 20 to 100° C., and more preferably 30 to 80° C. The stirring time during stirring by shaking is not particularly limited, but is preferably 20 to 300 minutes, and more preferably 60 to 150 minutes.

In case of using an aqueous solution containing hydrogen peroxide as an aqueous solution to activate the surface of the fiber membrane, the concentration of hydrogen peroxide in the solution is preferably 20 to 80 wt %, and more preferably 40 to 50 wt %.

Further, in case of using an aqueous solution containing sodium hydroxide, potassium hydroxide or ammonium as an aqueous solution to activate the surface of the fiber membrane, an aqueous solution containing any one of sodium hydroxide, potassium hydroxide or ammonium may be used or an aqueous solution containing more than two among these may be used, but the total concentration of sodium hydroxide, potassium hydroxide and ammonium (that is, the total of the concentration of sodium hydroxide, the concentration of potassium hydroxide and the concentration of ammonium in the aqueous solution) is preferably 0.01 to 10 mol/L, and more preferably 0.5 to 5 mol/L.

In the present invention, by bringing a solution containing a reaction mixture obtained by a hydrogenation reaction into contact with a fiber membrane having a group containing an amino group or a thiol group on the surface, thereby absorbing a platinum group metal included in the solution, or more specifically, absorbing platinum group metal particles of nano-order size existing in a free state in the solution to the fiber membrane having a group containing an amino group or a thiol group on the surface, and thus, such platinum group metal can be recovered efficiently. In particular, according to the present invention, platinum group metal particles in a solution containing a reaction mixture obtained by a hydrogenation reaction can be absorbed and recovered through methods such as filtration, using a fiber membrane having a group containing an amino group or a thiol group on the surface, therefore the space velocity (SV) of processing the solution can be further heightened, and thus, the efficiency of recovering platinum group metal particles can be further improved. Moreover, according to the present invention, the fiber membrane having a group containing an amino group or a thiol group on the surface used in the present invention is insoluble in an organic solvent forming the solution containing the reaction mixture obtained by the hydrogenation reaction, and thus, the fiber membrane does not remain or react in the organic solvent, which allows such organic solvent to be reused appropriately. As a result of this, the production efficiency can be raised.

Furthermore, in the above-described example, a method was illustrated of using a fiber membrane having a group containing an amino group or a thiol group on the surface as a method for recovering a catalyst, but in the method for recovering a catalyst of the present invention, silica having a group containing an amino group or a thiol group on the surface may be used instead of a fiber membrane having a group containing an amino group or a thiol group on the surface.

In the present invention, in case of using silica having a group containing an amino group or a thiol group on the surface, the method for producing a hydrogenated conjugated diene polymer comprises, a process for hydrogenation reaction, wherein, in a solvent, a conjugated diene polymer is hydrogenated in a presence of a catalyst containing a platinum group metal so as to obtain a solution containing a hydrogenated conjugated diene polymer, and a process for recovering a catalyst, wherein the solution containing a hydrogenated conjugated diene polymer is brought into contact with silica having a group containing an amino group or a thiol group on a surface, thereby recovering the platinum group metal included in the solution.

As a method for absorbing platinum group metal particles to silica having a group containing an amino group or a thiol group on the surface, though not particularly limited, (1) a method of adding silica having a group containing an amino group or a thiol group on the surface to a solution containing a hydrogenated conjugated diene polymer and stirring it, and (2) a method of flowing a solution containing a hydrogenated conjugated diene polymer into a column filled with silica having a group containing an amino group or a thiol group on the surface.

When bringing a solution containing a hydrogenated conjugated diene polymer into contact with silica having a group containing an amino group or a thiol group on the surface, the concentration of a hydrogenated conjugated diene polymer in a solution containing a hydrogenated conjugated diene polymer is preferably 0.001 to 20 wt %, more preferably 0.002 to 15 wt %, and even more preferably 0.005 to 10 wt %. By having it within this range, the productivity of recovering platinum group metal particles and the stability of recovery efficiency are advantageously maintained and it is preferable.

The ratio of adding and stirring silica having a group containing an amino group or a thiol group on the surface in a solution containing a hydrogenated conjugated diene polymer is, as the weight ratio of "hydrogenated conjugated diene polymer:silica having a group containing an amino group or a thiol group on the surface," preferably in the range of 1:0.01 to 1:100, and more preferably in the range of 1:0.01 to 1:50.

Further, the temperature when bringing silica having a group containing an amino group or a thiol group on the surface into contact with a solution containing a hydrogenated conjugated diene polymer is preferably 10 to 150° C., and more preferably 20 to 120° C. Also, the contact time is preferably 10 minutes to 100 hours, and more preferably 30 minutes to 72 hours.

In the method of flowing a solution containing a hydrogenated conjugated diene polymer into a column filled with silica having a group containing an amino group or a thiol group on the surface, the space velocity (SV) is preferably in the range of 0.1 to 50 (l/hr), and more preferably in the range of 0.2 to 10 (l/hr). By having the space velocity (SV) lower than the upper limit in the above range, the absorption rate of platinum group metals is more advantageously maintained. Meanwhile, by having the space velocity (SV) higher than the lowest limit in the above range, the efficiency of recovering platinum group metal particles is more advantageously maintained. Also, the space velocity (SV), for example, can be controlled by adjusting the pressure when a solution containing a hydrogenated conjugated diene polymer is flowed into a column filled with silica having a group containing an amino group or a thiol group on the surface.

Further, in the present invention, in case of using silica having a group containing an amino group on the surface as silica having a group containing an amino group or a thiol group on the surface, the amino group may have hydrogen atoms, which form the amino group, either substituted or unsubstituted, but is preferable to use an unsubstituted amino group, that is, a structure represented by $—NH_2$. For instance, the effect of absorbing platinum group metal particles tends to be lowered in an amino group substituted with an alkyl group.

Moreover, as the silica having a group containing an amino group or a thiol group on the surface, silica having a group containing only an amino group on the surface, or silica having a group containing only a thiol group on the surface, or silica having both of a group containing an amino group and a group containing a thiol group on the surface may be mentioned. Among these as well, from the viewpoint that the effect of absorbing platinum group metal particles is excellent, it is preferable to use silica having at least a group containing an amino group on the surface.

As a group containing an amino group forming silica having a group containing an amino group or a thiol group on the surface, the same group as the above-described group containing an amino group, which forms a fiber membrane having a group containing an amino group or a thiol group on the surface, may be used.

Furthermore, as a group containing a thiol group forming silica having a group containing an amino group or a thiol group on the surface, the same group as the above-described group containing a thiol group, which forms a fiber membrane having a group containing an amino group or a thiol group, may be used.

The average particle diameter of silica having a group containing an amino group or a thiol group is not particularly limited, but is preferably 1 μm to 10 mm, and more preferably 2 μm to 1 mm.

Also, according to the present invention, by absorbing platinum group metal particles existing in a free state in a solution to silica having a group containing an amino group or a thiol group on the surface, then separating silica thereof through filtration or centrifugation, the platinum group metal particles existing in a free state in the solution can be efficiently recovered.

According to the present invention, by bringing a solution containing a reaction mixture obtained by a hydrogenation reaction into contact with silica having a group containing an amino group or a thiol group on the surface, thereby absorbing a platinum group metal included in the solution, or more specifically, absorbing platinum group metal particles of nano-order size existing in a free state in the solution to silica having a group containing an amino group or a thiol group on the surface, and thus, such platinum group metal can be recovered efficiently. Also, according to the present invention, silica having a group containing an amino group or a thiol group on the surface, used in the present invention, is insoluble in an organic solvent forming the solution containing the reaction mixture obtained by the hydrogenation reaction, and thus, the silica does not remain or react in the organic solvent, which allows such organic solvent to be reused appropriately. As a result of this, the production efficiency can be raised.

EXAMPLES

Below, examples and comparative examples will be given to specifically explain the present invention. In the following, unless otherwise stated, "parts" are based on weight.

(Evaluation of Diameter of Platinum Group Metal Particles)

The diameter of platinum group metal particles in a filtrate, which was obtained by filtering a solution of hydrogenated acrylonitrile-butadiene copolymer obtained by a hydrogenation reaction, was measured using dynamic light-scattering method with a precision particle size distribution measurement instrument DLS8000 (manufactured by Otsuka Electronics Co., Ltd.). Here, with respect to the filtrate in which a peak of particle diameter in the range of more than 1 nm and 90 nm or less was observed, it was determined that platinum group metal particles of nano-order size were included.

Production Example 1

To a reactor, 2 parts of potassium oleate, 180 parts of ion exchange water, 37 parts of acrylonitrile and 0.5 parts of t-dodecylmercaptan were charged in that order. The inside gas was replaced with nitrogen, then 63 parts of butadiene was charged. Further, the reactor was held at 10° C., 0.01 parts of cumene hydroperoxide and 0.01 parts of ferrous sulfate were added. The mixture was stirred for 16 hours while holding the reactor at 10° C. After that, 10 wt % of hydroquinone aqueous solution was added to the reactor to stop the polymerization reaction, and unreacted monomers were removed from the polymerization reaction solution, thereby obtaining latex of acrylonitrile-butadiene copolymer. The polymerization conversion rate was 90%.

Further, to a reactor different to the one mentioned above, 300 parts of coagulating water in which 3 parts of calcium chloride (coagulating agent) was dissolved was poured, then it was stirred at 50° C., and the above obtained latex was added dropwise into the coagulating water. After that, a potassium hydroxide aqueous solution was added to coagulate polymer crumb while maintaining the pH at 11.5, then the polymer crumb was obtained from the coagulating water, washed in water and was dried under reduced pressure at 50° C. The obtained polymer crumb was then dissolved in acetone, to thereby prepare an acetone solution of 15 wt % in polymer content.

To the obtained acetone solution of acrylonitrile-butadiene copolymer, a silica-supported palladium (Pd) catalyst (the amount of Pd is 1,000 ppm by weight in the ratio of "Pd metal/acrylonitrile-butadiene copolymer") was added, then this was added to an autoclave attached with a stirrer, and nitrogen gas was flowed into the autoclave for 10 minutes to remove dissolved oxygen. Then, the inside gas was replaced twice with hydrogen gas and hydrogen pressure of 5 MPa was pressed, then the mixture was heated at 50° C. and stirred for 6 hours to perform a hydrogenation reaction.

After terminating the hydrogenation reaction, the reaction system was cooled at room temperature, and hydrogen in the system was replaced with nitrogen. And then, filtration was performed with respect to the solution of hydrogenated acrylonitrile-butadiene copolymer which was obtained by hydrogenation reaction, to thereby recover a silica-supported palladium catalyst. Some of the obtained filtrate was collected, and was poured into ten times volume of water to coagulate polymer, and then the obtained polymer was dried in vacuo for 24 hours, to thereby obtain a hydrogenated acrylonitrile-butadiene copolymer of solid form. With respect to the obtained hydrogenated acrylonitrile-butadiene copolymer of solid form, the amount of palladium in the copolymer was measured using an atomic absorption analysis, then the amount of palladium was 145 ppm by weight. Also, the iodine value of the obtained hydrogenated acrylonitrile-butadiene copolymer was 7.4. Some of the obtained filtrate was collected and the diameter of platinum group metal particles was evaluated according to the method described above, then the peak of the particle diameter was in the range of more than 1 nm and 90 nm or less.

Production Example 2

In the same method as Production Example 1, the latex of acrylonitrile-butadiene copolymer (NBR) was obtained, this was coagulated and dissolved in acetone, to thereby obtain an acetone solution of acrylonitrile-butadiene copolymer of 15 wt % in polymer content.

Further, in a reactor different to the one described above, 1 part of palladium acetate, 3 parts of polymethylvinylether and 3 parts of hydrazine (concentration 10% aqueous solution) were mixed with 800 parts of acetone, thereby obtaining a catalyst solution (palladium acetate catalyst).

To the obtained acetone solution of acrylonitrile-butadiene copolymer, the catalyst solution prepared above was added in the amount of 250 ppm by weight in the ratio of "Pd metal/acrylonitrile-butadiene copolymer," then this was poured into an autoclave attached with a stirrer, and nitrogen gas was flowed into it for 10 minutes to remove dissolved oxygen. Then, the inside gas was replaced twice with hydrogen gas and hydrogen pressure of 5 MPa was pressed, then the mixture was heated at 50° C. and stirred for 6 hours to perform a hydrogenation reaction.

Some of the solution of the hydrogenated acrylonitrile-butadiene copolymer obtained by a hydrogenation reaction was collected, this was poured into ten times volume of water to coagulate polymer, and then the obtained polymer was dried in vacuo for 24 hours, to thereby obtain a hydrogenated acrylonitrile-butadiene copolymer of solid form. With respect to the obtained hydrogenated acrylonitrile-butadiene copolymer of solid form, the amount of palladium in the copolymer was measured using an atomic absorption analysis, then the amount of palladium was 250 ppm by weight. Also, the iodine value of the obtained hydrogenated acrylonitrile-butadiene copolymer was 7.4. Some of the obtained filtrate was collected and the diameter of platinum group metal particles was evaluated according to the method described above, then the peak of the particle diameter was in the range of more than 1 nm and 90 nm or less.

Production Example 3

In an aqueous solution in which 8.1 parts of hydrogen peroxide was diluted in 19.0 parts of distilled water, 0.1 part of a glass fiber membrane (A-1) of borosilicate glass available in the market (trade name "ADVANTEC GA-100" (pore diameter 1.0 μm)) was immersed in the solution at 60° C. for 30 minutes, and was stirred by shaking using a shaker, thereby obtaining a glass fiber membrane treated with hydrogen peroxide. After that, the glass fiber membrane treated with hydrogen peroxide taken out of the above aqueous solution was sufficiently washed with distilled water, and then, this was stirred by shaking at 80° C. for 2 hours using a shaker in a solution in which 0.2 part of 3-aminopropyl triethoxysilane as a silane coupling agent was diluted in 48.0 parts of distilled water to perform silane coupling treatment. And then, the glass fiber membrane treated with hydrogen peroxide, to which silane coupling treatment was performed, was sufficiently washed with methanol and distilled water, dried at 120° C. for 2 hours, and then a silane coupling agent was fixed to thereby obtain an aminopropyl group-modified glass fiber membrane (C-1). After that, with respect to the aminopropyl group-modified glass fiber membrane (C-1), a wide scan and narrow scan were performed under the general measurement condition using an X-ray photoelectron spectroscopic analysis (made by Ulvac-Phi, Model number "PHI5000 VersaProbe II"). Also, the measurement using the X-ray photoelectron spectroscopic analysis was performed on a glass fiber membrane (A-1) before treating with the hydrogen peroxide and silane coupling treatment. As a result, the ratio of content of each element in the glass fiber membrane (A-1) was 5.2 atomic % of carbon (C), 0 atomic % of nitrogen (N), 64.5 atomic % of oxygen (O) and 24.9 atomic % of silicon (Si). Meanwhile, the ratio of content of each element in the aminopropyl group-modified glass fiber membrane (C-1) was 12.2 atomic % of carbon (C), 2.1 atomic % of nitrogen (N), 57.4 atomic % of oxygen (O), and 25.5 atomic % of silicon (Si). From this result, nitrogen (N), which was not detected in the glass fiber membrane (A-1), was detected in the aminopropyl group-modified glass fiber membrane (C-1), and for this reason, it was confirmed that an amino group was adopted to the glass fiber membrane (A-1) by a silane coupling agent.

Production Example 4

Except for using, instead of 0.1 part of glass fiber membrane (A-1), 0.1 part of a glass fiber membrane (A-2) of borosilicate glass (trade name "ADVANTEC GB-100R" (pore diameter 0.6 μm)), the same procedure was followed as in Production Example 3 to obtain an aminopropyl group-modified glass fiber membrane (C-2) and the same procedure was followed as in Production Example 3 to evaluate it. As a result, the ratio of content of each element in the glass fiber membrane (A-2) was 5.1 atomic % of carbon (C), 0 atomic % of nitrogen (N), 64.6 atomic % of oxygen (O) and 25.3 atomic % of silicon (Si). Meanwhile, the ratio of content of each element in the aminopropyl group-modified glass fiber membrane (C-2) was 12.3 atomic % of carbon (C), 2.3 atomic % of nitrogen (N), 57.6 atomic % of oxygen (O) and 25.4 atomic % of silicon (Si). From this result, nitrogen (N), which was not detected in the glass fiber membrane (A-2), was detected in the aminopropyl group-modified glass fiber membrane (C-2), and for this reason, it was confirmed that an amino group was adopted to the glass fiber membrane (A-2) by a silane coupling agent.

Production Example 5

Except for using, instead of 0.1 part of glass fiber membrane (A-1), 0.1 part of a glass fiber membrane (A-3) of borosilicate glass (trade name "ADVANTEC GF-75" (pore diameter 0.3 μm)), the same procedure was followed as in Production Example 3 to obtain an aminopropyl group-modified glass fiber membrane (C-3) and the same procedure was followed as in Production Example 3 to evaluate it. As a result, the ratio of content of each element in the glass fiber membrane (A-3) was 5.2 atomic % of carbon (C), 0 atomic % of nitrogen (N), 64.9 atomic % of oxygen (O) and 25.0 atomic % of silicon (Si). Meanwhile, the ratio of content of each element in the aminopropyl group-modified glass fiber membrane (C-3) was 12.1 atomic % of carbon (C), 2.5 atomic % of nitrogen (N), 57.6 atomic % of oxygen (O) and 25.4 atomic % of silicon (Si). From this result, nitrogen (N), which was not detected in the glass fiber membrane (A-3), was detected in the aminopropyl group-modified glass fiber membrane (C-3), and for this reason, it was confirmed that an amino group was adopted to the glass fiber membrane (A-3) by a silane coupling agent.

Production Example 6

As a silane coupling agent, except for using, instead of 0.2 part of 3-aminopropyl triethoxysilane, 0.2 part of 3-mercaptopropyl triethoxysilane, the same procedure was followed as in Production Example 3 to obtain a mercaptopropyl group-modified glass fiber membrane (C-4) by fixing a silane coupling agent to a glass fiber membrane treated with hydrogen peroxide and the same procedure was followed as in Production Example 3 to evaluate it. As a result, the ratio of content of each element in the glass fiber membrane (A-1) was 5.2 atomic % of carbon (C), 0 atomic % of sulfur (S), 64.5 atomic % of oxygen (O) and 24.9 atomic % of silicon (Si). Meanwhile, the ratio of content of each element in the mercaptopropyl group-modified glass fiber membrane (C-4) was 14.1 atomic % of carbon (C), 1.7 atomic % of sulfur (S), 58.3 atomic % of oxygen (O) and 25.9 atomic % of silicon (Si). From this result, sulfur (S), which was not detected in the glass fiber membrane (A-1), was detected in the mercaptopropyl group-modified glass fiber membrane (C-4) after silane coupling treatment, and for this reason, it was confirmed that a thiol group was adopted to the glass fiber membrane (A-1) by a silane coupling agent.

Production Example 7

Except for using, instead of 0.1 part of glass fiber membrane (A-1), 0.1 part of a glass fiber membrane (A-2), the same procedure was followed as in Production Example 6 to obtain a mercaptopropyl group-modified glass fiber membrane (C-5) and the same procedure was followed as in Production Example 6 to evaluate it. As a result, the ratio of content of each element in the glass fiber membrane (A-2) was 5.1 atomic % of carbon (C), 0 atomic % of sulfur (S), 64.6 atomic % of oxygen (O) and 25.3 atomic % of silicon (Si). Meanwhile, the ratio of content of each element in the mercaptopropyl group-modified glass fiber membrane (C-5) was 14.2 atomic % of carbon (C), 2.0 atomic % of sulfur (S), 58.0 atomic % of oxygen (O) and 26.0 atomic % of silicon (Si). From this result, sulfur (S), which was not detected in the glass fiber membrane (A-2), was detected in the mercaptopropyl group-modified glass fiber membrane (C-5) after silane coupling treatment, and for this reason, it was confirmed that a thiol group was adopted to the glass fiber membrane (A-2) by a silane coupling agent.

Production Example 8

Except for using, instead of 0.1 part of glass fiber membrane (A-1), 0.1 part of a glass fiber membrane (A-3), the same procedure was followed as in Production Example 6 to obtain a mercaptopropyl group-modified glass fiber membrane (C-6) and the same procedure was followed as in Production Example 6 to evaluate it. As a result, the ratio of content of each element in the glass fiber membrane (A-3) was 5.2 atomic % of carbon (C), 0 atomic % of sulfur (S), 64.9 atomic % of oxygen (O) and 25.0 atomic % of silicon (Si). Meanwhile, the ratio of content of each element in the mercaptopropyl group-modified glass fiber membrane (C-6) was 14.2 atomic % of (C), 2.1 atomic % of sulfur (S), 57.7 atomic % of oxygen (O) and 25.6 atomic % of silicon (Si). From this result, sulfur (S), which was not detected in the glass fiber membrane (A-3), was detected in the mercaptopropyl group-modified glass fiber membrane (C-6) after silane coupling treatment, and for this reason, it was confirmed that a thiol group was adopted to the glass fiber membrane (A-3) by a silane coupling agent.

Example 1

A clear syringe of 25 mm in inside diameter and 130 mm in height (made by Musashi Engineering, Inc., trade name "Clear Syringe PSY-E Series") and a filter holder for the clear syringe of 25 mm in inside diameter (made by AS ONE, trade name "Swinnex filter holder") were prepared, and to the filter holder were put three layers of the aminopropyl group-modified glass fiber membrane (C-1) obtained in the Production Example 3, then the filter holder was connected to the clear syringe to make an instrument for recovering palladium. After that, an adapter tube (made by Musashi Engineering, Inc., trade name "Adapter Tube AT-E Series") was prepared, and this was then connected to the clear syringe, thereby enabling a pressure delivery (pressure filtration) with nitrogen.

Further, some of the solution of a hydrogenated acrylonitrile-butadiene copolymer after filtration obtained in Production Example 1 (solution obtained by using a silica-supported palladium catalyst during a hydrogenation reaction) was collected, to this, acetone was added so as to adjust the concentration of the hydrogenated acrylonitrile-butadiene copolymer to 5 wt %, and by using the instrument for recovering palladium, pressure filtration was perfumed by flowing nitrogen into the clear syringe to make the pressure reach 1.0 (kg/cm$^2$), which resulted in the space velocity (SV) of 564.8 (1/hr). After that, the solution obtained by pressure filtration using the instrument for recovering palladium was poured into ten times volume of water to coagulate the solids, then these were dried in vacuo for 24 hours, to thereby obtain a hydrogenated acrylonitrile-butadiene copolymer of solid form. With respect to the obtained hydrogenated acrylonitrile-butadiene copolymer of solid form, the amount of palladium content was measured and the rate of palladium recovery was calculated according to the following formula. The results are shown in Table 1.

The recovery rate of palladium (%)=((The amount of palladium in the copolymer obtained in Production Example 1−The amount of palladium in the copolymer obtained after pressure filtration)/The amount of palladium in the copolymer obtained in Production Example 1)×100

Here, in case the value of the rate of palladium recovery obtained by the above formula (recovery rate of palladium obtained based on the measurement result of palladium amount in the copolymer of solid form) is high, it represents that, by means of the pressure filtration, palladium is advantageously recovered from the solution of a hydrogenated acrylonitrile-butadiene copolymer. That is, when the content of palladium in the solution of a hydrogenated acrylonitrile-butadiene copolymer is higher, it means that there is more palladium contained in the copolymer of solid form obtained from this solution. For this reason, as in the above-described formula, the recovery rate of palladium, which is calculated based on the amount of palladium included in the copolymer pf solid form obtained without pressure filtration of the solution and the amount of palladium included in the copolymer of solid form obtained after pressure filtration of the solution, may be the index representing the recovery rate of palladium recovered from the solution through pressure filtration.

Examples 2 to 5

As a glass fiber membrane used in the instrument for recovering palladium, except for using, instead of three layers of the aminopropyl group-modified glass fiber membrane (C-1) overlapped, three layers of the aminopropyl group-modified glass fiber membrane (C-2) obtained in Production Example 4 overlapped (Example 2), one layer of the aminopropyl group-modified glass fiber membrane (C-3) obtained in Production Example 5 (Example 3), three layers of the aminopropyl group-modified glass fiber membrane (C-3) obtained in Production Example 5 overlapped (Example 4), and nine layers of the aminopropyl group-modified glass fiber membrane (C-3) obtained in Production Example 5 overlapped (Example 5), respectively, the same procedure was followed as in Example 1 to perform pressure filtration using the instrument for recovering palladium and the same procedure was followed as in Example 1 to evaluate it. The results are shown in Table 1. Also, in terms of Examples 2 to 5, the space velocity (SV) during pressure filtration while running nitrogen gas, so that the pressure of the clear syringe within the instrument for recovering palladium is 1.0 ($kg/cm^2$), is shown in Table 1, respectively.

Example 6

Except for using, instead of the solution of a hydrogenated acrylonitrile-butadiene copolymer after filtration obtained in Production Example 1, the solution of a hydrogenated acrylonitrile-butadiene copolymer obtained in Production Example 2 (the solution obtained by using a palladium acetate catalyst in the hydrogenation reaction), the same procedure was followed as in Example 1 to perform pressure filtration using the instrument for recovering palladium and the same procedure was followed as in Example 1 to evaluate it. The results are shown in Table 1. Moreover, in terms of Example 6, the space velocity (SV) during pressure filtration while running nitrogen gas, so that the pressure of the clear syringe within the instrument for recovering palladium is 1.0 ($kg/cm^2$), is shown in Table 1.

Examples 7 to 10

As a glass fiber membrane used in the instrument for recovering palladium, except for using, instead of three layers of the aminopropyl group-modified glass fiber membrane (C-1) overlapped, three layers of the aminopropyl group-modified glass fiber membrane (C-2) obtained in Production Example 4 overlapped (Example 7), one layer of the aminopropyl group-modified glass fiber membrane (C-3) obtained in Production Example 5 (Example 8), three layers of the aminopropyl group-modified glass fiber membrane (C-3) obtained in Production Example 5 overlapped (Example 9), and nine layers of the aminopropyl group-modified glass fiber membrane (C-3) obtained in Production Example 5 overlapped (Example 10), respectively, the same procedure was followed as in Example 6 to perform pressure filtration using the instrument for recovering palladium and the same procedure was followed as in Example 6 to evaluate it. The results are shown in Table 1. Also, in terms of Examples 7 to 10, the space velocity (SV) during pressure filtration while running nitrogen gas, so that the pressure of the clear syringe within the instrument for recovering palladium is 1.0 ($kg/cm^2$), is shown in Table 1, respectively.

Examples 11 to 15

As a glass fiber membrane used in the instrument for recovering palladium, except for using, instead of three layers of the aminopropyl group-modified glass fiber membrane (C-1) overlapped, three layers of the mercaptopropyl group-modified glass fiber membrane (C-4) obtained in Production Example 6 overlapped (Example 11), three layers of the mercaptopropyl group-modified glass fiber membrane (C-5) obtained in Production Example 7 overlapped (Example 12), one layer of the mercaptopropyl group-modified glass fiber membrane (C-6) obtained in Production Example 8 (Example 13), three layers of the mercaptopropyl group-modified glass fiber membrane (C-6) obtained in Production Example 8 overlapped (Example 14), and nine layers of the mercaptopropyl group-modified glass fiber membrane (C-6) obtained in Production Example 8 overlapped (Example 15), respectively, the same procedure was followed as in Example 1 to perform pressure filtration using the instrument for recovering palladium and the same procedure was followed as in Example 1 to evaluate it. The results are shown in Table 1. Also, in terms of Examples 11 to 15, the space velocity (SV) during pressure filtration while running nitrogen gas, so that the pressure of the clear syringe within the instrument for recovering palladium is 1.0 ($kg/cm^2$), is shown in Table 1, respectively.

Examples 16 to 20

As a glass fiber membrane used in the instrument for recovering palladium, except for using, instead of three layers of the aminopropyl group-modified glass fiber membrane (C-1) overlapped, three layers of the mercaptopropyl group-modified glass fiber membrane (C-4) obtained in Production Example 6 overlapped (Example 16), three layers of the mercaptopropyl group-modified glass fiber membrane (C-5) obtained in Production Example 7 overlapped (Example 17), one layer of the mercaptopropyl group-modified glass fiber membrane (C-6) obtained in Production Example 8 (Example 18), three layers of the mercaptopropyl group-modified glass fiber membrane (C-6) obtained in Production Example 8 overlapped (Example 19), and nine layers of the mercaptopropyl group-modified glass fiber membrane (C-6) obtained in Production Example 8 overlapped (Example 20), respectively, the same procedure was followed as in Example 6 to perform pressure filtration using the instrument for recovering palladium and the same procedure was followed as in Example 6 to evaluate it. The results are shown in Table 1. Also, in terms of Examples 16 to 20, the space velocity (SV) during pressure filtration while running nitrogen gas, so that the pressure of the clear syringe within the instrument for recovering palladium is 1.0 ($kg/cm^2$), is shown in Table 1, respectively.

Comparative Examples 1 to 3

As a glass fiber membrane used in the instrument for recovering palladium, except for using, instead of three layers of the aminopropyl group-modified glass fiber membrane (C-1) overlapped, three layers of the glass fiber membrane (A-1) overlapped (Comparative Example 1), three layers of the glass fiber membrane (A-2) overlapped (Comparative Example 2), and three layers of the glass fiber membrane (A-3) overlapped (Comparative Example 3), which are glass fiber membranes before the above treatment using hydrogen peroxide and that using silane coupling, respectively, the same procedure was followed as in Example 6 to perform pressure filtration using the instrument for recovering palladium and the same procedure was followed as in Example 6 to evaluate it. The results are shown in Table 1. Also, in terms of Comparative Examples 1 to 3, the space velocity (SV) during pressure filtration while running nitrogen gas, so that the pressure of the clear syringe within the palladium recovery instrument is 1.0 ($kg/cm^2$), is shown in Table 1, respectively.

TABLE 1

| | Catalyst used in hydrogenation | Glass fiber membrane used |
|---|---|---|
| Example 1 | Silica-supported palladium catalyst | Production Example 3 (Aminopropyl group-modified glass fiber membrane (C-1) "GA-100") |
| Example 2 | Silica-supported palladium catalyst | Production Example 4 (Aminopropyl group-modified glass fiber membrane (C-2) "GB-100R") |
| Example 3 | Silica-supported palladium catalyst | Production Example 5 (Aminopropyl group-modified glass fiber membrane (C-3) "GF-75") |
| Example 4 | Silica-supported palladium catalyst | Production Example 5 (Aminopropyl group-modified glass fiber membrane (C-3) "GF-75") |
| Example 5 | Silica-supported palladium catalyst | Production Example 5 (Aminopropyl group-modified glass fiber membrane (C-3) "GF-75") |
| Example 6 | Palladium acetate catalyst | Production Example 3 (Aminopropyl group-modified glass fiber membrane (C-1) "GA-100") |
| Example 7 | Palladium acetate catalyst | Production Example 4 (Aminopropyl group-modified glass fiber membrane (C-2) "GB-100R") |
| Example 8 | Palladium acetate catalyst | Production Example 5 (Aminopropyl group-modified glass fiber membrane (C-3) "GF-75") |
| Example 9 | Palladium acetate catalyst | Production Example 5 (Aminopropyl group-modified glass fiber membrane (C-3) "GF-75") |
| Example 10 | Palladium acetate catalyst | Production Example 5 (Aminopropyl group-modified glass fiber membrane (C-3) "GF-75") |
| Example 11 | Silica-supported palladium catalyst | Production Example 6 (Mercaptopropyl group-modified glass fiber membrane (C-4) "GA-100") |
| Example 12 | Silica-supported palladium catalyst | Production Example 7 (Mercaptopropyl group-modified glass fiber membrane (C-5) "GB-100R") |
| Example 13 | Silica-supported palladium catalyst | Production Example 8 (Mercaptopropyl group-modified glass fiber membrane (C-6) "GF-75") |
| Example 14 | Silica-supported palladium catalyst | Production Example 8 (Mercaptopropyl group-modified glass fiber membrane (C-6) "GF-75") |
| Example 15 | Silica-supported palladium catalyst | Production Example 8 (Mercaptopropyl group-modified glass fiber membrane (C-6) "GF-75") |
| Example 16 | Palladium acetate catalyst | Production Example 6 (Mercaptopropyl group-modified glass fiber membrane (C-4) "GA-100") |
| Example 17 | Palladium acetate catalyst | Production Example 7 (Mercaptopropyl group-modified glass fiber membrane (C-5) "GB-100R") |
| Example 18 | Palladium acetate catalyst | Production Example 8 (Mercaptopropyl group-modified glass fiber membrane (C-6) "GF-75") |
| Example 19 | Palladium acetate catalyst | Production Example 8 (Mercaptopropyl group-modified glass fiber membrane (C-6) "GF-75") |
| Example 20 | Palladium acetate catalyst | Production Example 8 (Mercaptopropyl group-modified glass fiber membrane (C-6) "GF-75") |
| Comparative Example 1 | Palladium acetate catalyst | Glass fiber membrane (A-1) "GA-100" |
| Comparative Example 2 | Palladium acetate catalyst | Glass fiber membrane (A-2) "GB-100R" |
| Comparative Example 3 | Palladium acetate catalyst | Glass fiber membrane (A-3) "GF-75" |

| | Number of glass fiber membrane (sheet) | Space Velocity (SV) (1/hr) | Residual amount of palladium (ppm by weight) | Recovery rate of palladium (%) |
|---|---|---|---|---|
| Example 1 | 3 | 564.8 | 91.5 | 36.9 |
| Example 2 | 3 | 582.7 | 86.6 | 40.3 |
| Example 3 | 1 | 1310.0 | 90.2 | 37.8 |
| Example 4 | 3 | 572.3 | 47.1 | 67.5 |
| Example 5 | 9 | 134.0 | 15.8 | 89.1 |
| Example 6 | 3 | 541.7 | 153.8 | 38.5 |
| Example 7 | 3 | 586.2 | 156.0 | 37.6 |
| Example 8 | 1 | 1255.9 | 147.5 | 41.0 |
| Example 9 | 3 | 526.3 | 49.0 | 80.4 |
| Example 10 | 9 | 120.9 | 11.8 | 95.3 |
| Example 11 | 3 | 520.8 | 97.7 | 32.6 |
| Example 12 | 3 | 541.8 | 97.0 | 33.1 |
| Example 13 | 1 | 1245.7 | 123.0 | 15.2 |
| Example 14 | 3 | 595.1 | 63.7 | 56.1 |
| Example 15 | 9 | 136.0 | 36.8 | 74.6 |
| Example 16 | 3 | 563.9 | 180.5 | 27.8 |
| Example 17 | 3 | 539.6 | 176.3 | 29.5 |
| Example 18 | 1 | 1239.1 | 206.3 | 17.5 |
| Example 19 | 3 | 530.6 | 132.3 | 47.1 |
| Example 20 | 9 | 121.3 | 76.8 | 69.3 |
| Comparative Example 1 | 3 | 572.3 | 248.0 | 0.8 |
| Comparative Example 2 | 3 | 561.3 | 246.5 | 1.4 |
| Comparative Example 3 | 3 | 582.8 | 244.8 | 2.1 |

As shown in Table 1, in case that a fiber membrane having a group containing an amino group or a thiol group on the surface is used, the recovery rate of palladium is high and an advantageous recovery of palladium are confirmed (Examples 1 to 20).

Meanwhile, when a fiber membrane to which neither an amino group nor a thiol group is adopted is used, the results show that the recovery rate of palladium is low and almost no palladium can be recovered (Comparative Example 1 to 3).

Example 21

Some of the solution of a hydrogenated acrylonitrile-butadiene copolymer after filtration obtained in Production Example 1 was collected and was poured into a vial, and acetone was added so that the concentration of the hydrogenated acrylonitrile-butadiene copolymer reached 5 wt %, after that, 100 parts of an aminopropyl group-modified silica (made by SIGMA-ALDRICH, trade name "QuadraSil AP", silica famed by adopting an aminopropyl group on the surface, average particle diameter 54 μm) was added with respect to 100 parts of a hydrogenated acrylonitrile-butadiene copolymer. This was stirred for 24 hours in a shaker (made by TAITEC Corporation, trade name "RECIPRO SHAKER SR-1") under the condition of 25° C. and 120 rpm, and filtration was performed, to thereby recover silica having an aminopropyl group.

Further, a filtrate after recovering an aminopropyl group-modified silica was poured into ten times volume of water to coagulate polymer, and then the obtained polymer was dried in vacuo for 24 hours, to thereby obtain a hydrogenated acrylonitrile-butadiene copolymer of solid form. With respect to the obtained hydrogenated acrylonitrile-butadiene copolymer of solid form, the amount of palladium in the copolymer was measured using an atomic absorption analysis, which measured 53.9 ppm by weight, and the recovery rate of palladium was 62.8%. The results are shown in Table 2. Also, the recovery rate of palladium was calculated based on "The recovery rate of palladium (%)=(The amount of palladium before performing recovery with aminopropyl group-modified silica−The amount of palladium after performing recovery with aminopropyl group-modified silica)/The amount of palladium before performing recovery with aminopropyl group-modified silica×100" (the same calculation is applied to Examples 22 to 24 and Comparative Examples 4 to 6 mentioned below).

Example 22

Except for changing the amount of content of aminopropyl group-modified silica from 100 parts to 300 parts, the same procedure was followed as in Example 21, and as a result, the amount of palladium in the obtained hydrogenated acrylonitrile-butadiene copolymer was 17.4 ppm by weight, and the recovery rate of palladium was 88.0%. The results are shown in Table 2.

Example 23

Except for using, instead of 100 parts of aminopropyl group-modified silica, 100 parts of a mercaptopropyl group-modified silica (made by SIGMA-ALDRICH, trade name "QuadraSil MP", silica famed by adopting a mercaptopropyl group on the surface, average particle diameter 54 μm), the same procedure was followed as in Example 21, and as a result, the amount of palladium in the obtained hydrogenated acrylonitrile-butadiene copolymer was 90.5 ppm by weight, and the recovery rate of palladium was 37.6%. The results are shown in Table 2.

Example 24

Except for changing the amount of content of mercaptopropyl group-modified silica from 100 parts to 300 parts, the same procedure was followed as in Example 23, and as a result, the amount of palladium in the obtained hydrogenated acrylonitrile-butadiene copolymer was 41.8 ppm by weight, and the recovery rate of palladium was 71.2%. The results are shown in Table 2.

Comparative Example 4

Except for using, instead of 100 parts of aminopropyl group-modified silica, 100 parts of methylthiourea group-modified silica (made by SIGMA-ALDRICH, trade name "QuadraSil MTU", silica famed by adopting a methylthiourea group on the surface, average particle diameter 54 μm), the same procedure was followed as in Example 21, and as a result, the amount of palladium in the obtained hydrogenated acrylonitrile-butadiene copolymer was 134.8 ppm by weight, and the recovery rate of palladium was 7.0%. The results are shown in Table 2.

Comparative Example 5

Except for using, instead of 100 parts of aminopropyl group-modified silica, 100 parts of tetraacetate group-modified silica (made by SIGMA-ALDRICH, trade name "QuadraSil TAA", silica famed by adopting a group having a structure of tetra-acetate group on the surface, average particle diameter 54 μm), the same procedure was followed as in Example 21, and as a result, the amount of palladium in the obtained hydrogenated acrylonitrile-butadiene copolymer was 145.0 ppm by weight, and the recovery rate of palladium was 0% (that is, almost no palladium could be recovered). The results are shown in Table 2.

Comparative Example 6

Except for using, instead of 100 parts of aminopropyl group-modified silica, 100 parts of ion exchange resin having a thiol group on the surface (made by Johnson Matthey, trade name "Smopex FG"), the same procedure was followed as in Example 21, and as a result, the amount of palladium in the obtained hydrogenated acrylonitrile-butadiene copolymer was 136.3 ppm by weight, and the recovery rate of palladium was 6.0%. The results are shown in Table 2.

TABLE 2

| | Catalyst used in hydrogenation | Compound used | Amount used to 100 parts of rubber (parts) | Residual amount of palladium (ppm by weight) | Recovery rate of palladium (%) |
|---|---|---|---|---|---|
| Example 21 | Silica-supported palladium catalyst | Aminopropyl group-modified silica | 100 | 53.9 | 62.8 |
| Example 22 | Silica-supported palladium catalyst | Aminopropyl group-modified silica | 300 | 17.4 | 88.0 |
| Example 23 | Silica-supported palladium catalyst | Mercaptopropyl group-modified silica | 100 | 90.5 | 37.6 |
| Example 24 | Silica-supported palladium catalyst | Mercaptopropyl group-modified silica | 300 | 41.8 | 71.2 |
| Comparative Example 4 | Silica-supported palladium catalyst | Methylthiourea group-modified silica | 100 | 134.8 | 7.0 |
| Comparative Example 5 | Silica-supported palladium catalyst | Tetraacetate structure-modified silica | 100 | 145.0 | 0.0 |
| Comparative Example 6 | Silica-supported palladium catalyst | Ion exchange resin having a thiol group | 100 | 136.3 | 6.0 |

Evaluation of Examples 21 to 24 and Comparative Examples 4 to 6

As shown in Table 2, when silica having a group containing an amino group or a thiol group on the surface is used, the recovery rate of palladium is high and an advantageous recovery of palladium are confirmed (Examples 21 to 24).

Meanwhile, when silica having a functional group other than an amino group or a thiol group, or ion exchange resin having a thiol group is used, it is confirmed that the recovery rate of palladium is low and almost no palladium can be recovered (Comparative Examples 4 to 6).

Example 25

A column of 18 mm in inside diameter and 300 mm in height was prepared, to this, 7 g of silica with an aminopropyl group (made by SIGMA-ALDRICH, trade name "QuadraSil AP", silica famed by adopting an aminopropyl group on the surface, average particle diameter 54 μm) was filled (the amount to reach 80 mm in height), thereby preparing a column for palladium recovery.

Further, some of the solution of a hydrogenated acrylonitrile-butadiene copolymer after filtration obtained in Production Example 1 was collected, this was passed through the column for palladium recovery prepared above under the condition of the space velocity (SV) of 1.7 (1/hr), and the solution that passed the column thereof was put into ten times volume of water to coagulate polymer, the obtained polymer was then dried in vacuo for 24 hours to thereby obtain a hydrogenated acrylonitrile-butadiene copolymer of solid form. With respect to the obtained hydrogenated acrylonitrile-butadiene copolymer of solid form, the amount of palladium in the copolymer was measured using an atomic absorption analysis, which measured 2.0 ppm by weight, and the recovery rate of palladium was 98.6%. The results are shown in Table 3. Also, the recovery rate of palladium was calculated based on "The recovery rate of palladium (%)=(The amount of palladium before passing through the column for palladium recovery−The amount of palladium after passing through the column for palladium recovery)/The amount of palladium before passing through the column for palladium recovery×100" (the same calculation is applied to Examples 26 to 36 mentioned below).

Examples 26 to 28

The column for palladium recovery prepared following the procedure same as in Example 25 was used, and except for changing the space velocity (SV) of the solution of a hydrogenated acrylonitrile-butadiene copolymer after filtration obtained in Production Example 1 flowing into the column for palladium recovery to 2.1 (1/hr), 2.7 (1/hr) and 3.1 (1/hr), respectively, the same procedure was followed as in Example 25. The amount of palladium in the obtained hydrogenated acrylonitrile-butadiene copolymer and the recovery rate of palladium were according to the results shown in Table 3.

Example 29

The column for palladium recovery prepared following the procedure same as in Example 25 was used, and except for using, instead of the solution of a hydrogenated acrylonitrile-butadiene copolymer after filtration obtained in Production Example 1, the solution of a hydrogenated acrylonitrile-butadiene copolymer obtained in Production Example 2, and changing the space velocity (SV) when flowing into the column for palladium recovery to 1.2 (1/hr), the same procedure was followed as in Example 25. The amount of palladium in the obtained hydrogenated acrylonitrile-butadiene copolymer was 7.2 ppm by weight, and the recovery rate of palladium was 97.1%. The results are shown in Table 3.

Examples 30 to 32

The column for palladium recovery prepared following the procedure same as in Example 25 was used, and except for changing the space velocity (SV) of the solution of a hydrogenated acrylonitrile-butadiene copolymer obtained in Production Example 2 flowing into the column for palladium recovery to 1.7 (1/hr), 2.1 (1/hr) and 2.4 (1/hr), respectively, the same procedure was followed as in Example 29. The amount of palladium in the obtained hydrogenated acrylonitrile-butadiene copolymer and the recovery rate of palladium were according to the results shown in Table 3.

Example 33

A column of 18 mm in inside diameter and 300 mm in height was prepared, to this, 7 g of a mercaptopropyl group-modified silica (made by SIGMA-ALDRICH, trade name "QuadraSil MP", silica famed by adopting a mercaptopropyl group on the surface, average particle diameter 54 μm) was filled (the amount to reach 80 mm in height), thereby preparing a column for palladium recovery.

Further, except for using the column for palladium recovery prepared above, and changing the space velocity (SV) of the solution of a hydrogenated acrylonitrile-butadiene copolymer obtained in Production Example 2 to 0.8 (1/hr), the same procedure was followed as in Example 29, as a result, the amount of palladium in the obtained hydrogenated acrylonitrile-butadiene copolymer was 21.0 ppm by weight, and the recovery rate of palladium was 91.6%. The results are shown in Table 3.

Examples 34 to 36

The column for palladium recovery prepared following the procedure same as in Example 13 was used, and except for changing the space velocity (SV) of the solution of a hydrogenated acrylonitrile-butadiene copolymer obtained in Production Example 2 flowing into the column for palladium recovery to 1.2 (1/hr), 1.6 (1/hr) and 1.7 (1/hr), respectively, the same procedure was followed as in Example 13. The amount of palladium in the obtained hydrogenated acrylonitrile-butadiene copolymer and the recovery rate of palladium were according to the results shown in Table 3.

TABLE 3

| | Catalyst used in hydrogenation | Compound used | Space Velocity (SV) (1/hr) | Residual amount of palladium (ppm by weight) | Recovery rate of palladium (%) |
|---|---|---|---|---|---|
| Example 25 | Silica-supported palladium catalyst | Aminopropyl group-modified silica | 1.7 | 2.0 | 98.6 |
| Example 26 | Silica-supported palladium catalyst | Aminopropyl group-modified silica | 2.1 | 22.5 | 84.5 |
| Example 27 | Silica-supported palladium catalyst | Aminopropyl group-modified silica | 2.7 | 34.7 | 76.1 |
| Example 23 | Silica-supported palladium catalyst | Aminopropyl group-modified silica | 3.1 | 34.2 | 76.4 |
| Example 23 | Palladium acetate | Aminopropyl group-modified silica | 1.2 | 7.2 | 97.1 |
| Example 30 | Palladium acetate | Aminopropyl group-modified silica | 1.7 | 9.5 | 96.2 |

TABLE 3-continued

| | Catalyst used in hydrogenation | Compound used | Space Velocity (SV) (1/hr) | Residual amount of palladium (ppm by weight) | Recovery rate of palladium (%) |
|---|---|---|---|---|---|
| Example 31 | Palladium acetate | Aminopropyl group-modified silica | 2.1 | 14.7 | 94.1 |
| Example 32 | Palladium acetate | Aminopropyl group-modified silica | 2.4 | 22.4 | 91.0 |
| Example 33 | Palladium acetate | Mercaptopropyl group-modified silica | 0.8 | 21.0 | 91.6 |
| Example 34 | Palladium acetate | Mercaptopropyl group-modified silica | 1.2 | 96.1 | 61.6 |
| Example 35 | Palladium acetate | Mercaptopropyl group-modified silica | 1.6 | 129.0 | 48.4 |
| Example 36 | Palladium acetate | Mercaptopropyl group-modified silica | 1.7 | 194.8 | 22.1 |

Evaluation of Examples 25 to 36

As shown in Table 3, when silica having a group containing an amino group or a thiol group on the surface is used, even if the method of using a column is adopted, it can be confirmed that the recovery rate of palladium is high and palladium can be advantageously recovered (Examples 25 to 36).

The invention claimed is:

1. A method for removing a platinum group metal from a solution containing a hydrogenated conjugated diene polymer and the platinum group metal, the hydrogenated conjugated diene polymer being obtained by hydrogenating a conjugated diene polymer in an organic solvent in the presence of a catalyst containing the platinum group metal, the method comprising:

contacting the solution with a fiber membrane having a group containing an amino group or a thiol group on a surface so as to make the fiber membrane adsorb the platinum group metal, thereby removing at least part of the platinum group metal included in the solution;

wherein the solution is contacted with the fiber membrane by filtering the solution with the fiber membrane at a space velocity (SV) in the range of 100 to 2,000 (1/hr).

2. A method for removing a platinum group metal from a solution containing a hydrogenated conjugated diene polymer and the platinum group metal, the hydrogenated conjugated diene polymer being obtained by hydrogenating a conjugated diene polymer in an organic solvent in the presence of a catalyst containing the platinum group metal, the method comprising:

contacting the solution with silica having a group containing an amino group or a thiol group on a surface so as to make the silica adsorb the platinum group metal, thereby removing at least part of the platinum group metal included in the solution;

wherein the solution is contacted with the silica by flowing the solution into a column filled with the silica at a space velocity (SV) in the range of 0.1 to 50 (1/hr).

3. The method according to claim 1, wherein the platinum group metal is palladium.

4. A method for reducing the amount of a platinum group metal in a solution containing a hydrogenated conjugated diene polymer and the platinum group metal, the hydrogenated conjugated diene polymer being obtained by hydrogenating a conjugated diene polymer in an organic solvent in the presence of a catalyst containing the platinum group metal, the method comprising:

contacting the solution with a fiber membrane having a group containing an amino group or a thiol group on a surface so as to make the fiber membrane adsorb the platinum group metal, thereby removing at least part of the platinum group metal included in the solution;

wherein the solution is contacted with the fiber membrane by filtering the solution with the fiber membrane at a space velocity (SV) in the range of 100 to 2,000 (1/hr).

5. A method for reducing the amount of a platinum group metal in a solution containing a hydrogenated conjugated diene polymer and the platinum group metal, the hydrogenated conjugated diene polymer being obtained by hydrogenating a conjugated diene polymer in an organic solvent in the presence of a catalyst containing the platinum group metal, the method comprising:

contacting the solution with silica having a group containing an amino group or a thiol group on a surface so as to make the silica adsorb the platinum group metal, thereby removing at least part of the platinum group metal included in the solution;

wherein the solution is contacted with the silica by flowing the solution into a column filled with the silica at a space velocity (SV) in the range of 0.1 to 50 (1/hr).

* * * * *